US008639558B2

(12) United States Patent
Desai et al.

(10) Patent No.: US 8,639,558 B2
(45) Date of Patent: Jan. 28, 2014

(54) PROVIDING MARKDOWN ITEM PRICING AND PROMOTION CALENDAR

(75) Inventors: Paritosh Desai, Santa Clara, CA (US); Rob Parkin, San Francisco, CA (US); John Crowther, Belmont, CA (US); David Davtian, Walnut Creek, CA (US); France Savard, Lorraine (CA); Krishna Venkatraman, Palo Alto, CA (US); Chi-Yi Kuan, Fremont, CA (US); Fedor Dzegilenko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 11/534,986

(22) Filed: Sep. 25, 2006

(65) Prior Publication Data
US 2008/0077459 A1    Mar. 27, 2008

(51) Int. Cl.
*G06F 17/00*    (2006.01)
(52) U.S. Cl.
USPC ........................................... 705/7.29
(58) Field of Classification Search
USPC ........................................... 705/7, 400, 7.29
See application file for complete search history.

(56) References Cited

U.S. PATENT DOCUMENTS

| | | | |
|---|---|---|---|
| 6,078,893 A | 6/2000 | Ouimet et al. | |
| 6,094,641 A | 7/2000 | Ouimet et al. | |
| 6,378,066 B1 | 4/2002 | Lewis | |
| 6,553,352 B2 | 4/2003 | Delurgio et al. | |
| 7,062,447 B1 | 6/2006 | Valentine et al. | |
| 7,062,477 B2 | 6/2006 | Fujiwara et al. | |
| 7,092,929 B1 | 8/2006 | Dvorak et al. | |
| 7,302,410 B1 | 11/2007 | Venkatraman et al. | |
| 7,523,047 B1 | 4/2009 | Venkatraman et al. | |
| 7,617,119 B1 | 11/2009 | Neal et al. | |
| 7,660,734 B1 | 2/2010 | Neal et al. | |
| 7,899,691 B1 | 3/2011 | Lee et al. | |
| 2003/0028437 A1 | 2/2003 | Grant et al. | |
| 2003/0200185 A1 | 10/2003 | Huerta et al. | |
| 2003/0220830 A1 | 11/2003 | Myr | |
| 2005/0096963 A1 | 5/2005 | Myr et al. | |
| 2006/0026161 A1 | 2/2006 | Henseler | |
| 2006/0161504 A1 | 7/2006 | Walser et al. | |

OTHER PUBLICATIONS

Malantra et al; An implementable approach for optimizing department store mark-down decisions; Apr. 1994; Stores, v76n4 pp. RR1-RR6.*
"PCT International Search Report and the Written Opinion of the International Searching Authority", Application No. PCT/US 07/20678, mailed Feb. 26, 2008.
"Net Perceptions: Cascade" by Net Perceptions, Inc., 2003; pp. 1-80.
Coleman et al. "Plan Tuning Engine", U.S. Appl. No. 11/365,153, filed Feb. 28, 2006.
Coleman et al. "Scalable Tuning Engine", U.S. Appl. No. 11/364,966, filed Feb. 28, 2006.
Coleman et al. "Computer Architecture", U.S. Appl. No. 11/365,634, filed Feb. 28, 2006.

* cited by examiner

*Primary Examiner* — Thomas Dixon
(74) *Attorney, Agent, or Firm* — Rahan Uddin; Edell, Shapiro & Finnan, LLC

(57) ABSTRACT

An apparatus for providing relative optimized pricing for markdown items is provided. A financial engine for determining revenue for determining sales costs is provided. An optimization engine receiving input from the financial engine and uses the determined sales costs to provide relative optimized pricing for markdown items and provides pricing and a promotion calendar for non-markdown items.

54 Claims, 9 Drawing Sheets

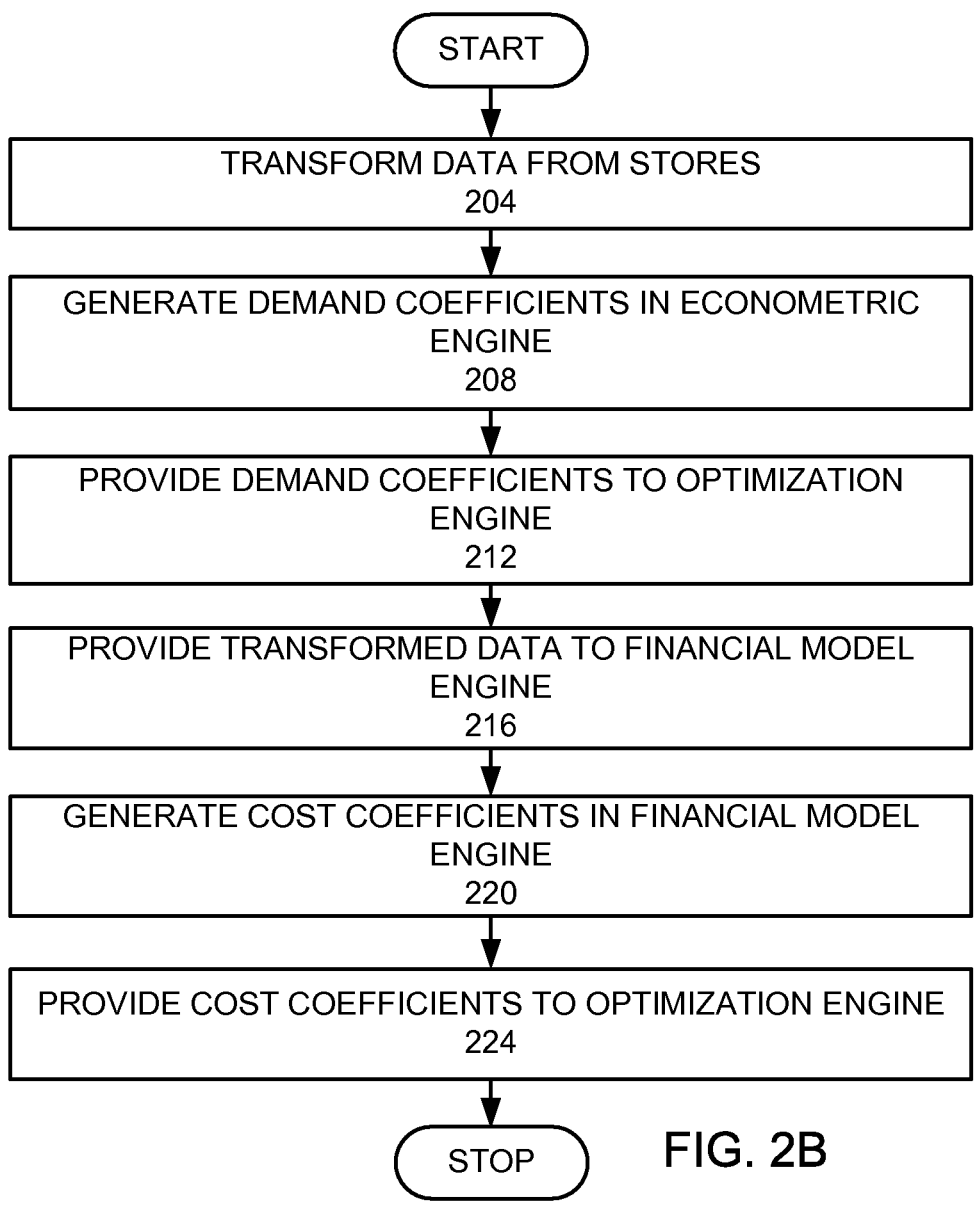

PROVIDING MARKDOWN ITEM PRICING AND PROMOTION CALENDAR

BACKGROUND OF THE INVENTION

The present invention relates a device for providing markdown prices.

In retail businesses, prices of various products must be set. Such prices may be set with the goal of maximizing margin or demand or for a variety of other objectives. Margin is the difference between total revenue and costs. Total sales revenue is a function of demand and price, where demand is a function of price. Demand may also depend on the day of the week, the time of the year, the price of related products, location of a store, the location of the products within the store, advertising and other promotional activity both current and historical, and various other factors. In addition, demand is also heavily influenced by the seasonal patterns and holidays. As a result, the function for forecasting demand may be very complex. Costs may be fixed or variable and may be dependent on sales volume, which in turn depends on demand. As a result, the function for forecasting margin may be very complex. For a chain of stores with tens of thousands of different products, identifying the relevant factors for each product and store, then determining a function representing that demand are difficult. The enormous amount of data that must be processed for such determinations is too cumbersome even when done by computer. Further, the methodologies used to forecast demand and the factors that contribute to it require the utilization of non-obvious, highly sophisticated statistical processes.

Such processes are described in U.S. Pat. No. 7,062,447, entitled IMPUTED VARIABLE GENERATOR, filed Dec. 20, 2000 and issued Jun. 13, 2006 by Valentine et al., and U.S. patent application Ser. No. 09/741,958, entitled PRICE OPTIMIZATION SYSTEM, filed Dec. 20, 2000 by Venkatraman et al., which both are incorporated by reference for all purposes.

A markdown is a schedule of known price reductions taken over a relatively short time interval with the express purpose of managing a product out the assortment gracefully and cost-effectively. Markdowns occur for various reasons including planned assortment transitions or resets, product obsolescence and discontinuance brought on by changes in technology, taste, law and a myriad of other factors that affect consumer demand. Category resets and assortment changes are by far the major drivers of markdown pricing.

Markdown pricing is an important consideration for retailers who sell seasonal, fashion, or other short-life-cycle products. "Clearance markdown dollars" which equal the revenue that would be generated at regular price minus the actual dollars obtained from marked-down items, often amount to several million dollars per year for major retail chains. While markdown discounts boost sales, they erode profits. Taking into account generally thin margins for the majority of retailers, the implementation of optimal markdown policies (that is, the timing and magnitude of markdowns) becomes crucial.

In addition, markdown pricing is a more highly focused specific goal-driven activity than base price and promotion. It also tends to be more tactical in nature, liquidating inventory over a specific time period. The objective of pricing during the clearance period is different from base pricing or promotions. Although the business task of pricing is the same, the approach, importance and decision criteria for pricing during the clearance period is different.

SUMMARY OF THE INVENTION

To achieve the foregoing and other objects and in accordance with the purpose of the present invention an apparatus for providing relative optimized pricing for markdown items is provided. A financial engine for determining revenue for determining sales costs is provided. An optimization engine receiving input from the financial engine and uses the determined sales costs to provide relative optimized pricing for markdown items and provides pricing and a promotion calendar for non-markdown items.

The optimization engine may comprise an engine, including computer memory executed using a processor, for providing non-markdown item pricing; an engine, including computer memory executed using the processor, for providing a promotion calendar; and an engine, including computer memory executed using the processor, for providing markdown item pricing. The optimization engine may further comprise computer readable code for storing a plurality of rules, computer readable code for allowing the prioritization of the plurality of rules, and computer readable code for relaxing at least one lower priority rule to allow a higher priority rule to become feasible.

In another manifestation of the invention, a computer implemented method for providing pricing for markdown items and non-markdown items is provided. Sales, cost, and competitive data from the plurality of stores are collected. The collected sales, cost, and competitive data are analyzed using a computer to generate competing optimal schedules with respect to a primary objective. Optimized pricing and a markdown schedule for markdown items and optimized pricing for non-markdown items are provided. The markdown schedule includes a primary objective and a secondary objective. Providing optimized pricing includes selecting between competing optimal schedules by weighing the primary objective and the secondary objective, with the primary objective having greater weight than the secondary objective. The selecting optimizes for the weighted objectives. On an at least weekly basis, sales of the markdown items are analyzed using the computer processor. The markdown schedule is tuned using the computer processor based on the analyzing data collected on an at least weekly basis. A tuned markdown schedule is provided.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-C are flow charts of a process that uses the optimizing system.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The invention provides a markdown optimization system that provides markdown prices.

Optimization System

To facilitate understanding, an embodiment of the a markdown optimization system which provides markdown pricing will be described. The purpose of the markdown optimization system is to receive raw data that relates to a specified econometric problem; and to use coefficients generated by econometric modeling engine that represents the significant factors affecting the behaviors represented by the data; and to generate a set of markdown prices realizing user goal (profit, sales etc) while obeying various business constraints (observing inventory levels, observing cadence of prices suggested by the user etc). In one example, the econometric engine produces coefficients that represent the driving factors for consumer demand, synthesized from sales volume and other retail-business related data inputs.

The purpose of the Markdown optimization model is to help retailers decide what the markdown schedule should be for a given product or set of products. Retailers typically do markdowns (or discounts) at the end of a product's lifecycle (Product lifecycle refers to the natural evolution of product demand in the market. For example, an item might start out with a low demand, then pick up demand as it gets popular and then finally decline as it is no longer desired by the consumers) in order to move that product out of inventory. In the past, this has typically been done utilizing a fixed schedule of markdowns based on the retailer's intuition and the need to move the product out of inventory. The preferred embodiment of the invention provides optimal recommendations that accounts for related merchandising activities store-wide or within the category. This consideration becomes important when only a subset of related or like items are being considered for markdowns and another subset is being actively promoted.

Figure 1:
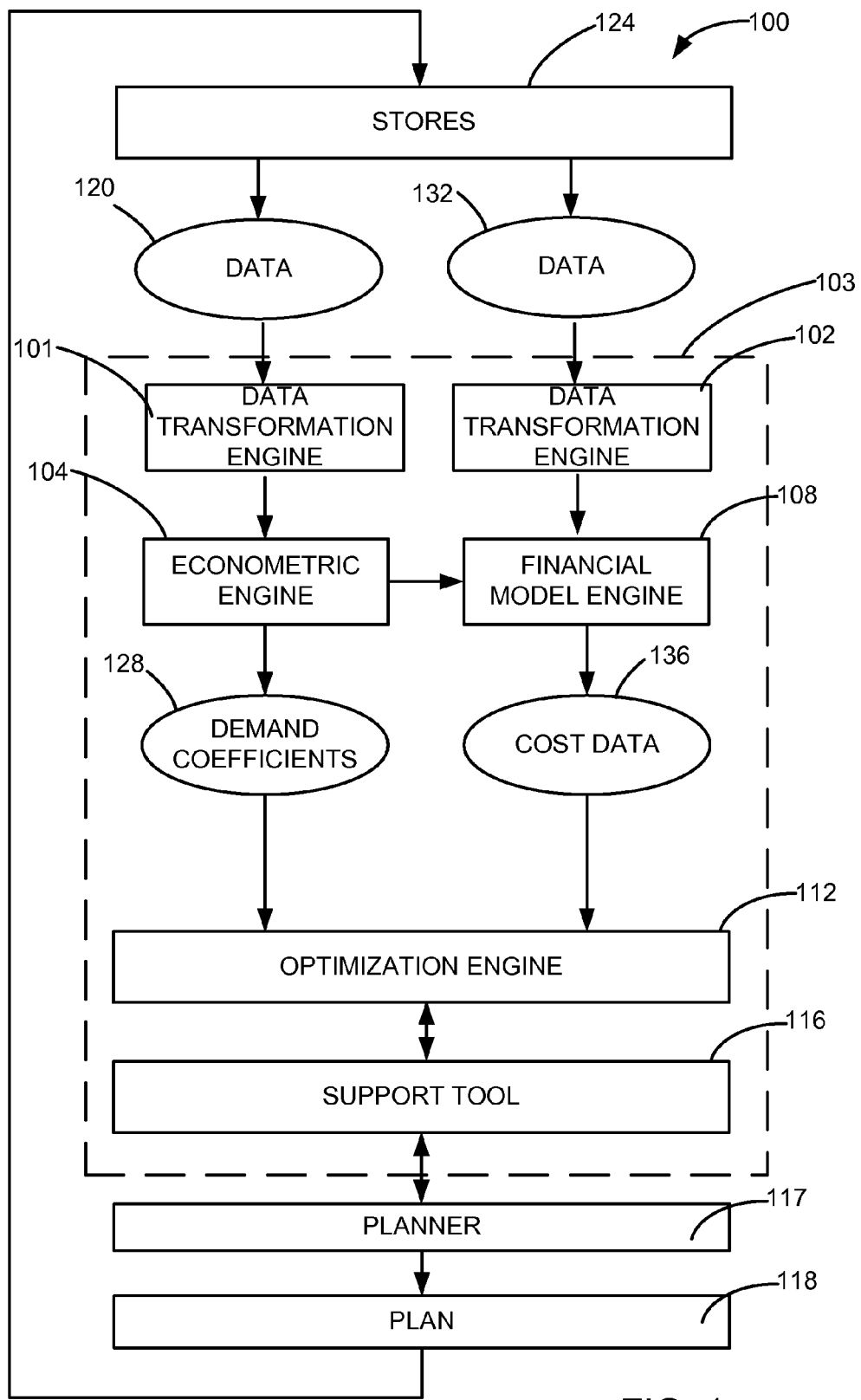
FIG. 1 is a high level schematic view of an optimizing system.

FIG. 1 is a schematic view of an optimizing system 100 using a processing system 103. The processing system 103 comprises a first data transformation engine 101, a second data transformation engine 102, econometric engine 104, a financial model engine 108, an optimization engine 112, and a support tool 116. The econometric engine 104 is connected to the optimization engine 112, so that the output of the econometric engine 104 is an input of the optimization engine 112. The financial model engine 108 is connected to the optimization engine 112, so that the output of the financial model engine 108 is an input of the optimization engine 112. The optimization engine 112 is in two-way communications with the support tool 116 so that output of the optimization engine 112 is provided as input to the support tool 116. The support tool 116 is in two-way communication with a planner 117, who is a user. The planner 117 may use the support tool to generate a plan 118. The plan 118 is implemented by the stores 124.

Figure 2A:
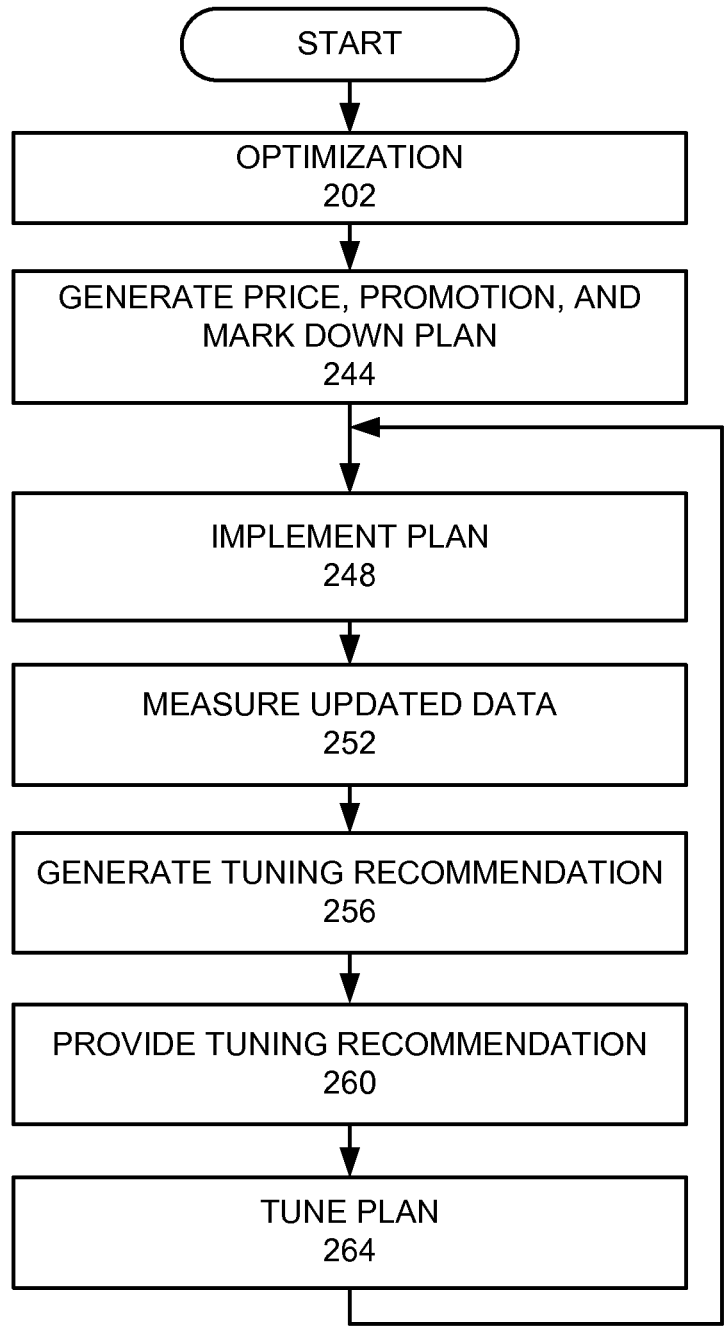

FIG. 2A is a high level flow chart of an optimizing process that uses the optimizing system 100. An optimization is performed (step 202).

FIG. 2B is a more detailed flow chart of the optimization (step 202). Data 120, 132 is provided from the stores 124 to the first data transformation engine 101 and the second data transformation engine 102, where the data from the stores is transformed (step 204). Generally, the data provided to the first data transformation engine 101 and the second data transformation engine 102 may be point-of-sale information, product information, and store information. The transformed data from the first data transformation engine 101 is then provided to the econometric engine 104. The econometric engine 104 processes the transformed data to provide demand coefficients 128 (step 208) for a set of algebraic equations that may be used to estimate demand (volume sold) given certain marketing conditions (i.e. a particular store in the chain), including a price point.

Figure 4:
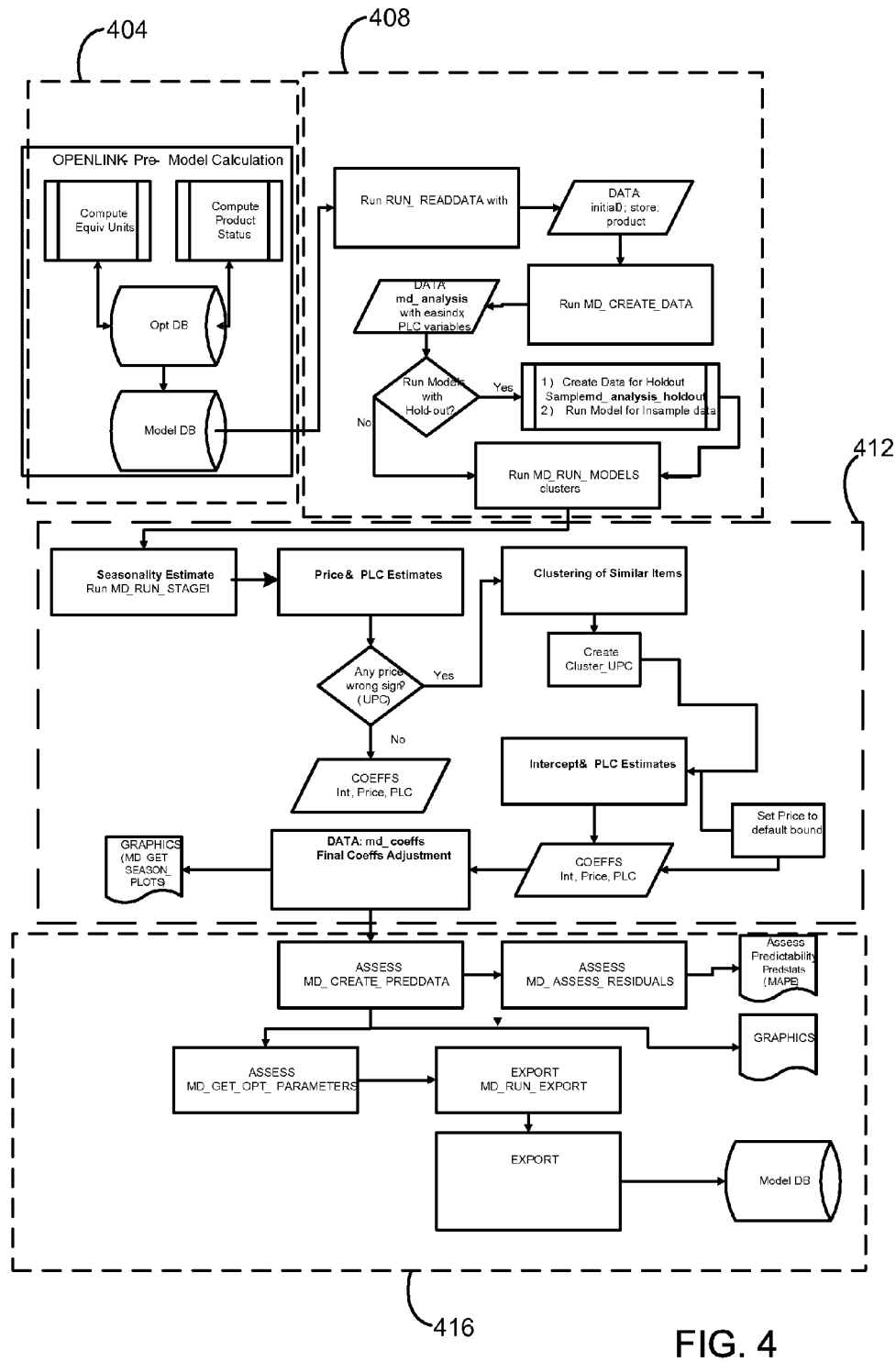
FIG. 4 flow of an example of data transformation and demand coefficient generation.

FIG. 4 is a more detailed the flow chart of an example of an implementation steps 204 and 208 which provides markdown optimization, starting from receiving customer data, data transformations, and running the markdown econometric model. Specifically, customer provides the POS data that is stored in multiple databases—modeling and optimization databases (step 404). The raw data in the modeling database undergoes multiple transformations (such as error checking, corrections for missing/incorrect items, custom aggregations, dividing dataset into different subsets etc) (step 408). At this point, data is ready to run the econometric model.

The econometric modeling (step 412) includes estimations for seasonality, price elasticity, and product life-cycle terms. Further, it shows how incorrect coefficients are flagged and corrected for by a variety of means (re-clustering, enforcing correct sign etc).

After completing modeling (which results into generation of all the demand coefficients), it passes through an assess model that automatically determines the overall quality of the model by comparison with actual data (forecast comparison exercise) and additionally, it provides reports on the quality in different forms (step 416).

After completing the above steps, a model is deemed to be ready for production use. At this point, the coefficients and other relevant quantities are passed to the optimization database, with which the user interacts via GUI to obtain optimal markdown recommendations.

The demand coefficients 128 are provided to the optimization engine 112 (step 212). Additional processed data from the econometric engine 104 may also be provided to the optimization engine 112. The financial model engine 108 may receive transformed data from the second data transformation engine 102 (step 216) and processed data from the econometric engine 104. The transformed data is generally cost related data, such as average store labor rates, average distribution center labor rates, cost of capital, the average time it takes a cashier to scan an item (or unit) of product, how long it takes to stock a received unit of product and fixed cost data. The financial model engine 108 may process the data to provide a variable cost and fixed cost for each unit of product in a store (step 220). The processing by the econometric engine 104 and the processing by the financial model engine 108 may be done in parallel. Cost data 136 is provided from the financial model engine 108 to the optimization engine 112 (step 224). The optimization engine 112 utilizes the demand coefficients 128 to create a demand equation. The optimization engine is able to forecast demand and cost for a set of prices to calculate net profit (margin).

Various price and promotion optimizations may be used, in various embodiments, such as the price and promotions described in the references cited above. These optimizations are combined with a markdown optimization, which will be described in more detail below.

Figure 2C:
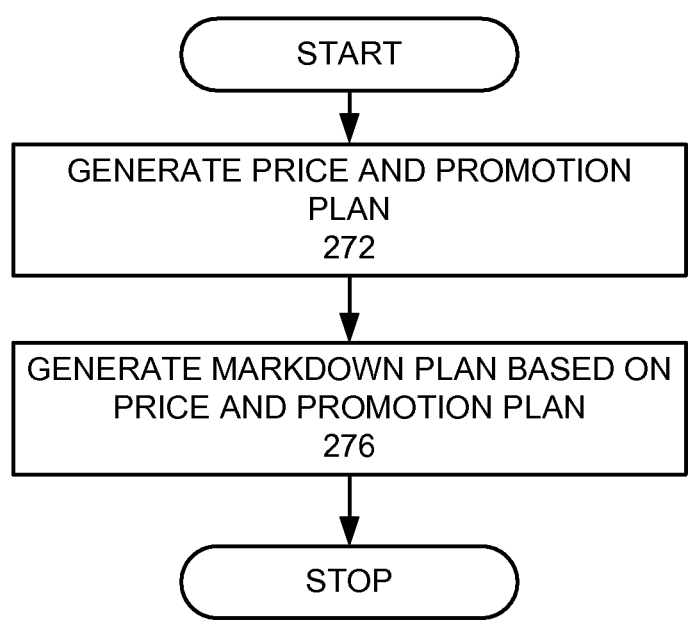

A price, promotion, and markdown plan is then generated (step 244). A price, promotion, and markdown plan sets prices for regular items, provides a promotional calendar for promotional items, and provides a markdown schedule for markdown items. By providing these three items in a single plan, an integrated plan is provided that optimizes price, promotion, and markdown, so that they do not interfere with each other. In order to generate a plan, the planner 117 provides to the support tool 116 optimization rules. The optimization engine 112 may use the demand equation, the variable and fixed costs, and the rules to compute an optimal set of prices that meet the rules. FIG. 2C is a more detailed flow chart of the step of generating a price, promotion, and markdown plan used in an embodiment of the invention. In this embodiment, a price and promotion plan is first generated (step 272). The price and promotion plan provides optimized pricing and a promotion plan. An optimized markdown plan is then generated based on the price and promotion plan (step 276). The planner 117 may be able to provide different sets of rules to create different scenarios to determine different "What if" outcomes. From the various scenarios and outcomes, the planner is able to create a plan.

For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices (both the promoted prices and the markdown prices) that allow for the promotion of the one product and the maximization of profit under that condition. A rule may provide for a markdown of an item, where the markdown maximizes revenue while allowing for the item to be no longer sold by a certain deadline. In the specification and claims, the phrases "optimal set of prices" or "preferred set of prices" are defined as a set of computed prices for a set of products where the prices meet all of the rules. The rules normally include an optimization goal, such as optimizing profit or optimizing volume of sales of a product and constraints such as a limit in the variation of prices and other time-based limitations (such as minimum time between discounts). The optimal (or preferred) set of prices is defined as prices that define a local optimum of an econometric model, which lies within constraints specified by the rules. When profit is maximized, it may be maximized for a sum of all measured products. Such a maximization, may not maximize profit for each individual product, but may instead have an ultimate objective of maximizing total profit.

By optimizing non-markdown item pricing, promotion scheduling, and markdown scheduling, a master merchandizing calendar may be generated that shows all pricing scenarios and events with pre-season and in-season activity. This ensures maximum forecast accuracy incorporating all cannibalization and halo effects in a store. One result may be the reduction of markdowns as markdown optimization is integrated with pricing and promotion planning. In addition, the master merchandizing calendar may be used to manage conflict between price optimization, promotion plans, and markdown plans.

For a price optimization plan, the optimal set of prices is the plan. The plan may be for a long term. For example, the plan may set weekly prices for the next six months.

The plan is then implemented (step 248). This may be done by having the planner 117 send the plan 118 to the stores 124 so that the stores carry out the plan. In one embodiment, the support tool provides a graphic user interface that provides a button that allows the planner to implement the plan. The support tool would also have software to signal to the stores to implement the plan. In another embodiment, software on a computer used by the planner would integrate the user interface of the support tool with software that allows the implementation of the plan displayed by the support tool by signaling to the stores to implement the plan.

The results of the plan are measured with updated data (step 252). Updated data may be provided on a weekly or daily basis. The updated data may be sent to the processing system 103.

The updated data is used to generate a tuning recommendation (step 256). This may be done in various ways. One way is by generating a new plan, which may be compared with the long range plan. Another way may be to use the updated data to see how accurate the long range plan was for optimization or for prediction of sales. Other data may be measured to determine if tuning should be recommended without modeling the updated data.

In one embodiment the detection of changes to externally defined cost and competitive price information, and updates to the plan required to maintain business rule conformance are used as factors to determine whether tuning is needed. To detect such factors the econometric model is not needed, but instead other factors are used. The econometric model may then be updated based on such changes to "tune" the optimized plan for changing conditions In another embodiment, tuning is performed when certain threshold conditions are reached—i.e. changes are substantial enough to materially impact the quality of the previously optimized plan. Other examples where tuning is required includes a rapid change in the fashion trend causing corresponding change in the demand, change in weather or season causing a significant change in demand, and change in the timing of the category/product reset decision. In such processes, the econometric model may be used to provide predictions and then compared to actual data.

The system is able to provide a tuning recommendation (step 260). This may be implemented by setting a range or limits either on the data itself or on the values it produces. In the first case, if changes to the updated data relative to the original data exceed a limit or move beyond a certain range, a flag or other indicator may be used to recommend tuning to the user. In the second case, if the updated data creates prediction errors beyond the specified range or limits, a flag may be used to recommend tuning to a user.

For example, a competitor price index may be used in the optimization and in generation of a tuning indicator. A competitor price index is a normalized index of competitor prices on a set of items sold at a set of locations in relation to those provided by the plan, using competitor price data that is provided through various services. As a specific example, a user might define a competitor price index on all brands and sizes of paper towels sold at stores with a retail chain A located less than five miles away (the identification of retail chain a locations would be done outside the system). An indicator can then be provided to identify when prices provided by the plan exceed a competitor price index of 105—in other words when they are above the competitor's prices by more than 5% on some subset of items (in the case above, when retail chain A has lowered paper towel prices, resulting in a change to that competitor price index relative to the plan). In another example, costs are always changing. It is usually undesirable to change prices immediately every time costs change. Therefore, in another example, the system provides a tuning recommendation when either small cost changes cause an aggregate change of more than 5% or a single cost change causes a cost change of more than 3%. Therefore, the tuning indicators are based on formulas that measure either changes in individual data or changes in relationships between values of the data.

In another example, the user might define triggers on the level of sales achieved against the target. Thus, if the actual sales are below a threshold (say of 25%) below the projected sales, it will trigger a re-optimization or a re-prediction based upon the updated sales and inventory information. This might also trigger a re-estimation of the econometric model (if warranted) to capture changes in consumer demand since the previous model estimation.

In viewing the re-predicted outcome and the tuning recommendation, the planner 117 is able to have the processing system 103 tune the plan (step 264). The planner 117 may then send out a message to implement the tuned plan (step 248). A single screen may show both the information that the planner needs to use to make a decision and provide a button to allow the planner to implement a decision. The button may also allow tuning on demand, whenever desired by the user.

This process allows for a long term plan to be corrected over the short term. For markdown planning, this tuning is especially important. This allows for corrections if the long term plan has an error, which in the short term may be less significant, but over the long term may be more significant. The tactical nature of markdown process makes it critical that these models and optimizations are examined and tuned very rapidly, perhaps once every week or more often. These changes are based upon observed changes in the demand that would necessitate a change in markdown strategy to meet the original goals. This would further entail possibly running markdown model estimations frequently to re-adjust the functional relationship for the latest changes. In addition, current events may change the accuracy of a long term model. Such current events may be a change in the economy or a natural disaster. Such events may make a six-month plan using data from the previous year less accurate. The ability to tune the plan on at least a weekly basis with data from the previous week makes the plan more responsive to current events.

The optimization system provides a promotional plan that plans and schedules product promotions. Without the optimization system, poor-performing promotions may go unidentified until it is too late to make changes that materially affect their performance. The use of constant updates helps to recognize if such a plan creates business problems and also allows a short term tuning to avoid further damage. For example, a promotion plan may predict that a discount coupon for a particular product for a particular week will increase sales of the product by 50%. A weekly update will within a week determine the accuracy of the prediction and will allow a tuning of the plan if the prediction is significantly off.

The invention provides markdown pricing. The use of constant updates may be used to both manage a product out of the assortment and maximize revenue using markdown prices. The invention provides an integrated pricing program that for setting prices, setting promotions, and setting markdowns, so that prices, promotions, and markdowns may be optimized together.

In one embodiment, the system allows an automatic tuning when a long term plan is not accurate within a certain percentage. In another embodiment, the planner may be allowed to decide whether the long term plan is in enough agreement with the updated data so that the long term plan is kept without tuning. In addition, other notification elements may exist in the system allowing the user to set up customized alerts based upon his/her chosen criteria. The customization includes setting priority based upon a set of merchandising outcomes such as levels or changes in levels of sales, revenues, etc. These alerts may be delivered to the user in multiple ways (e.g. email, pager, text message etc). This allows the user to take the desired action.

Thus, the invention allows the integration between the operational system of a business, which sets prices, promotions, and markdowns and performs other sales or business functions, with the analytical system of a business which looks at sales or other performance information, to allow a planner to receive timely analytical information and then change the operational system and then to quickly, through the analytical system, see the results of the change in the operational system to determine if other changes in the operational system need to be made.

Such a constant tuning of a plan is made difficult by the large amount of data that needs to be processed and the complexity of the processing, which could take weeks to process or would be too expensive to process to make such tuning profitable. U.S. patent application Ser. No. 11/365, 153, filed Feb. 28, 2006, entitled, "PLAN TUNING ENGINE", by Alan Coleman et al., U.S. patent application Ser. No. 11/364,966, filed Feb. 28, 2006, entitled, "SCALABLE TUNING ENGINE", by Alan Coleman et al., and U.S. patent application Ser. No. 11/365,634, filed Feb. 28, 2006, entitled, "COMPUTER ARCHITECTURE", by Alan Coleman et al., U.S. all of which are incorporated by reference for all purposes, discloses a system for allowing the constant tuning of a plan. A price optimization system is described in U.S. patent application Ser. No. 09/741,958, filed Dec. 20, 2000, entitled "PRICE OTIMIZATION SYSTEM", by Krishna Venkatraman et al., now U.S. Pat. No. 7,523,047, which is incorporated by reference. A system for creating an optimized promotion event calendar is described in U.S. patent application Ser. No. 09/849,783, filed May 5, 2001, entitled "SYSTEM FOR CREATING OPTIMIZED PROMOTION EVENT CALENDAR", by Krishna Venkatraman et al., now U.S. Pat. No. 7,660,734, which is incorporated by reference. An Econometric Engine system is described in U.S. patent application Ser. No. 09/741,956, filed Dec. 20, 2000, entitled "ECONOMETRIC ENGINE", by Hau Lee et al., which is incorporated by reference. A system for providing rule relaxation is described in U.S. patent application Ser. No. 09/888,340, filed on Jun. 21, 2001, entitled "PRICE OPTIMIZATION WITH RULE RELAXATION", by Michael Neal et al., now U.S. Pat. No. 7,617,119, which is incorporated by reference.

Data 120 is provided to the processing system 103. The data 120 may be raw data generated from cash register data, which may be generated by scanners used at the cash registers. The first data transformation engine 101 and the second data transformation engine 102 format the data so that it is usable in the econometric engine and financial model engine. Some data cleansing, such as removing duplicate entries, may be performed by the first and second data transformation engine 101, 102.

Figure 3:
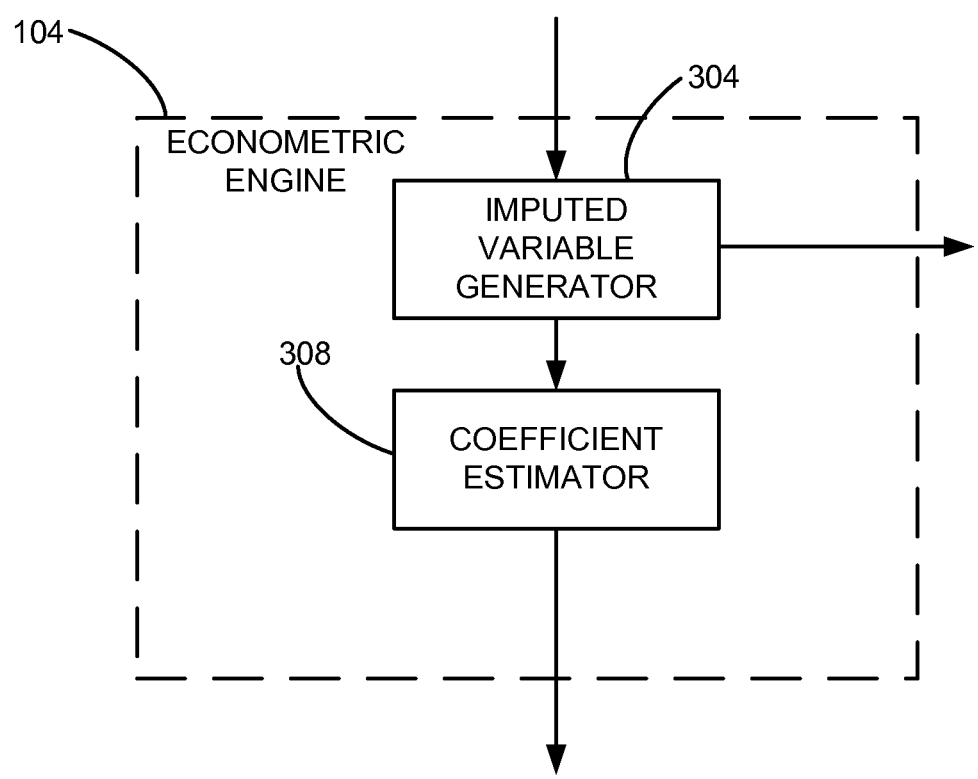
FIG. 3 is a schematic view of an econometric engine.

FIG. 3 is a more detailed view of the econometric engine 104. The econometric engine comprises an imputed variable generator 304 and a coefficient estimator 308. The formatted data from the first data transformation engine 101 is provided to the imputed variable generator 304. The imputed variable generator 304 generates a plurality of imputed econometric variables.

Figure 7:
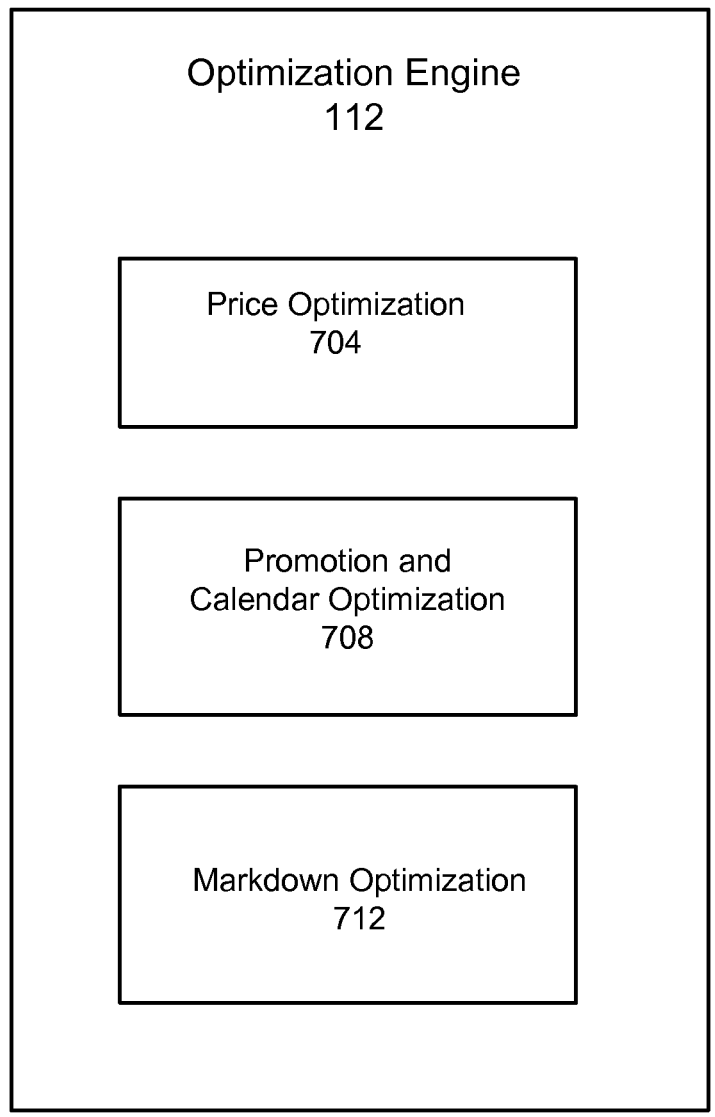
FIG. 7 is a more detailed view of an optimization engine.

FIG. 7 is a more detailed view of an optimization engine 112 that may be used in an embodiment of the invention. The optimization engine 112 comprises a price optimization engine 704 that optimizes prices of non-markdown items, a promotion and calendar optimization engine 708, and a markdown optimization engine 712.

Figure 6A:
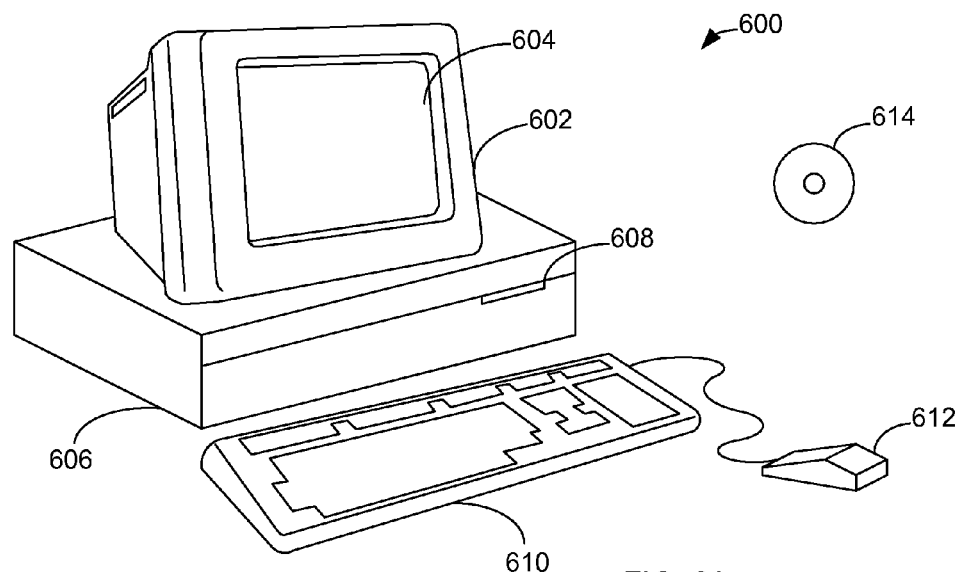
FIGS. 6A and 6B are views of a computer system that may be used in an embodiment of the invention.

FIGS. 6A and B illustrate a computer system 600, which may be suitable for implementing embodiments of the present invention. FIG. 6A shows one possible physical form of the computer system. Of course, the computer system may have many physical forms ranging from an integrated circuit, a printed circuit board, and a small handheld device up to a huge super computer. Computer system 600 includes a monitor 602, a display 604, a housing 606, a disk drive 608, a keyboard 610, and a mouse 612. Disk 614 is a computer-readable medium used to transfer data to and from computer system 600.

Figure 6B:
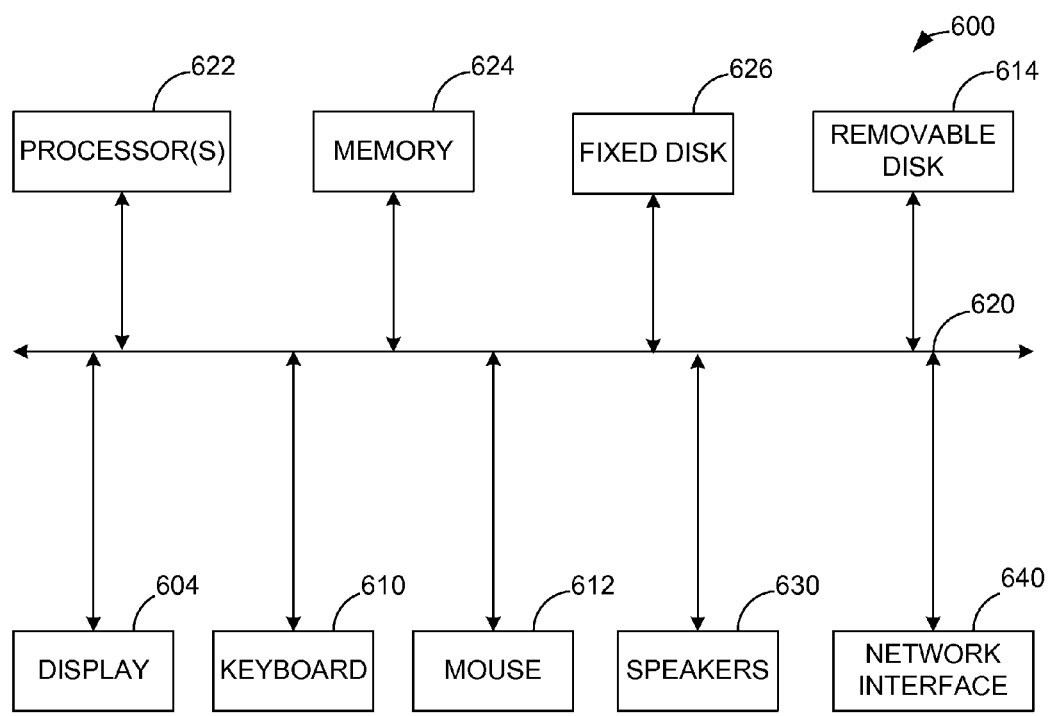

FIG. 6B is an example of a block diagram for computer system 600. Attached to system bus 620 is a wide variety of subsystems. Processor(s) 622 (also referred to as central processing units, or CPUs) are coupled to storage devices, including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data, and the like and is typically a secondary storage medium (such as a hard disk) that is slower than primary storage. It will be appreciated that the information retained within fixed disk 626 may, in appropriate cases, be incorporated in standard fashion as virtual memory in memory 624. Removable disk 614 may take the form of any of the computer-readable media described below.

CPU 622 is also coupled to a variety of input/output devices, such as display 604, keyboard 610, mouse 612, and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Demand groups are groups of highly substitutable products, such as different sizes or brands of the same product or alternative products. Determination of demand groups is a complex process that leverages both the domain knowledge and inferred statistical relationships between products. Further, demand groups may differ from retailer to retailer since it also depends upon the exact product assortment being carried by a retail chain.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

Markdown System Characteristics

A markdown is a schedule of known price reductions taken over a relatively short time interval with the express purpose of managing a product out the assortment gracefully and cost-effectively. Markdowns occur for various reasons including planned assortment transitions or resets, product obsolescence and discontinuance brought on by changes in technology, taste, law and a myriad of other factors that affect consumer demand. Category resets and assortment changes are by far the major drivers of markdown pricing.

A category reset is a major change in the assortment of a category or group of products during which managers, merchants, and buyers remove a substantial fraction of products in the category from the assortment and replace them with new products. The products that they select from removal are usually those that aren't selling well, have been discontinued, or have been replaced by a newer technology, whereas the replacements typically represent newer technology (consumer electronics), line extensions and re-packaging of existing products.

Products that exit the assortment during these resets do so in three ways. They may be returned to the vendor (RTV), they may be sold to alternate channels ("sold sideways"), or they may be phased out in the stores via a controlled set of rapid price reductions. This last alternative is known as markdown pricing. In consumer electronics, the number of such assortment transitions depends on the pace of technology change in the product category in question, the timing of new product introductions by key manufacturers, and, to some extent by seasonal and holiday factors. In the case of apparel retailers, style and season drive these changes. At grocers category resets result from annual or semi-annual reviews of product assortment. In general, most retailers maintain and publish a calendar of planned resets or assortment transitions and support these calendars with several well defined processes and related data. Since resets themselves are regular episodic events at many retailers, many of them rely on a backbone of supporting data to manage them efficiently. The markdown process should ensure that the users of the product are not burdened with looking for and managing this supporting data.

For many retailers, markdown pricing is one of three ways they use to remove products from the assortment. A markdown plan is a schedule of known price reductions over a short time interval and is designed to sell off remaining inventory in a manner consistent with the financial metrics of the product category. A plan must accommodate several hard operational constraints as well as a number of business rules that guide strategy in order to be viable and practical.

Buyers will choose an objective and create a plan based on guidelines for the category and the set of products, and on the time available to complete the markdown phase. Unfortunately, buyers frequently have to plan and execute markdowns in a reactive mode. They may learn that a manufacturer intends to replace a product within a matter of 2-4 weeks. In other cases, sudden technology transitions may suddenly make a product considerably less attractive to consumers and require a phase-out of its inventory in short order.

While the immediate goal of markdown pricing is to sell down a set of discontinued products, this goal goes hand in hand with the larger objective of ensuring the transition between the old products and the new entering products proceeds smoothly. This means that the assortment choice during the markdown cycle is respectable and consumers do not leave the store in droves because of a thin assortment.

Constraints

Operational constraints come about due to a variety of reasons. Capacitated resources like store-labor place limits on how frequently prices may change in stores and these limits, in turn, translate to a variety of operational constraints. For instance, the operational calendar at the stores may stipulate that markdown prices can change only on particular days of the week, and on particular dates on the calendar. Other operational constraints may require some minimum time period between successive markdowns. For instance, a retailer may have a minimum period of 2 weeks. Local, state and federal regulations may impose operational restrictions as well, most notably in determining the minimum price reduction required to qualify as a markdown or clearance price. Furthermore, once a product has been placed on clearance, there are often legal restrictions that prevent retailers from raising the price for an extended period of time ranging from 6 months to a year.

Business constraints arise from a host of considerations. Some constraints like the last digit rule exist simply because it is helpful for an analyst to be able to distinguish between markdown prices and other regular or promotional prices. Some companies do this by requiring markdown prices to end in specified last digits with rules that enforce these requirements. More commonly, though, buyers and analysts drive other business rules with a view toward financial performance during the markdown cycle. These rules include among others: maximum markdown percents and values that can be applied to products on each occasion, maximum total markdown percent over the entire markdown cycle, the set of allowable price points, and the maximum number of markdown occasions during the cycle.

Markdown Parameters and Attributes

In the inventive system, all of these rules and constraints are defined by parameters or attributes and values that fully describe them. They apply to individual products and include: the planned start and end dates for the markdown period for the product, the number of markdown occasions allowed for the product, the maximum total markdown allowed expressed as a percent, the minimum interval between successive markdown occasions, the salvage value of the product expressed as cents on the dollar which value is the percent of the product cost at which the leftover inventory may be sold, the set of allowable markdown prices for the product, the default objective to use in determining the markdown plan, the allowable dates and days for markdowns, and the operational calendar that specifies the days and dates on which markdowns can occur and the holding cost (expressed as a percentage) which is the cost of capital that remains tied up in the inventory.

The merchandising hierarchies at different retailers employ different criteria to create and maintain product groups within the hierarchy. Some of these product groups are especially relevant to markdown planning. For example, for Company A, which is into clothing, seasonal and style attributes generate sets of products that match a combination of season and style levels. On the other hand, for company B, which is into electronics, a senior buyer may use product groups consisting of all products within a category that have a planned discontinuance date that falls in some user-specified interval. Such product groups may be called dynamic product groups since their membership is dynamic and depends at any point in time on the products that meet the criteria.

While these attributes apply eventually to each product, their values may be defined at several levels of a product hierarchy. For instance, the maximum markdown percent per markdown occasion may be specified globally at the corporate level and applies to all products. However, this value may be over-ridden at lower levels of the hierarchy like the category or sub-category level, or product group level. A markdown system needs to allow users to establish these hierarchies.

The markdown parameter values may be redefined at the level of these product groups and inherited by the products that belong to them. In general, the products inherit the value at the lowest level of the appropriate product hierarchy.

Part of the reason for this hierarchy is because various companies have different people with different authority in defining markdown and other pricing and promotion constraints. Buyers and analysts generally create and maintain multiple product and store hierarchies and use them in different phases of markdown planning. For instance, a junior buyer at Company B will use at least two different store hierarchies for markdown management. The first links stores to supplying DCs (distribution centers or the warehouses from where products will be delivered to a given store) and the second organizes stores by region. Both hierarchies are useful and necessary for markdown planning and execution.

Similarly, buyers and planners do select the set of products for markdown in a number of ways. They may traverse some portion of the merchandize hierarchy to select the set of products to include in the markdown or use dynamic or custom product groups. For instance, in the apparel vertical, seasonal products may be grouped together within a seasonal product group and clustered further by size-color combinations. In this case, buyers may wish to select all products within a seasonal product group that match a certain color and size combination. Alternatively, in electronics, the assortment transition process produces a list of products that are candidates to be marked down. In such cases, buyers may have a list of product IDs and may simply want to search through product catalogue for these ids, and include them in the markdown. Finally, users also like to search through the hierarchy as well to select products.

The retailer supply chain system collects and maintains in-store and in-warehouse inventory levels as well as the in-transit and on-order inventory. Planners use this information to set thresholds on metrics like the remaining weeks of supply in the system. These metrics and thresholds help buyers to decide when to begin the markdown cycle itself. The inventory level and position are vital in creating and adjusting the markdown schedule since the goal of a markdown cycle is to exit the assortment gracefully.

Creating a Markdown Plan

The first step in creating a markdown plan is to name it and to bookend, the time interval with a starting date and an ending date or out-date. The starting date is the first date on which a plan may recommend a markdown action such as a price reduction.

The next step is to select the set of products of interest and the set of stores over which the markdown is to run. At this point, there are two paths a buyer may take—he may create a fully specified markdown plan by specifying the markdown items using the support tool, or set up an optimization scenario with objectives, rules, and control parameters. The support tool may have graphic user interfaces for tasks such as specifying markdown price constraints, providing constraints to the optimization engine, designating markdown items, and setting markdown rules.

Defining Markdown Plan Specifications on the Support Tool:

A user may access the support tool to define markdown plan specifications. The markdown plan specifications may specify items to be marked down, markdown time periods, and possibly how many items are to be marked down. The markdown period may specify when the markdown begins and a target date to end the markdown, which may either be when the markdown item inventory is sold out or the item ceases to be sold by the retailer. A markdown plan simply requires a schedule of markdown prices for each store and each product under consideration. A schedule in turn has two facets, the timing of the various price changes and the depth of each price change. At one extreme, a buyer may apply the same schedule to every product and every store, and at the other, may apply a different schedule for each store-sku location. In practice, the happy medium is, in fact, something in between.

Buyers will typically create schedules for stores that are clustered by geography or by warehouse. If products have distinctive selling patterns by geography or region, (beachwear for e.g.), regional clusters are appropriate, whereas if products have substantial warehouse inventory at the beginning of the markdown cycle, buyers will opt to set a common schedule across stores that share common warehouses. Sometimes buyers may choose to cluster stores because doing so reduces the practical operational impact of pricing within the store. Stores have to implement markdown prices fairly rapidly and if the number of store-sku price changes multiplies rapidly, the labor cost and resources will overwhelm the capacity of the stores to implement the changes.

Buyers may also cluster products and assign a common schedule to each cluster. This happens, most notably, when products fall into price bands and buyers wish to allow different price points and percent discounts to products in each price band. In such cases, buyers will create a different schedule for each price band.

In summary, schedules may be shared by user-defined product groups such as those defined by price bands as well as by groups of stores such as partitions by geography or zone or warehouse structure.

Creating an Optimization Scenario:

When optimizing a markdown plan, buyers usually focus on some key parameters—the objective, the optimal number of markdown occasions, the timing of each occasion, and the depth of price discount at each occasion. Looking at each in turn:

The preferred embodiment allows users to select both a primary and secondary objectives used in selecting a markdown schedule. It also provides a rules framework for implementing and maintaining various business strategies. The fundamental problem for the optimization is to find the best markdown schedule given the user's objectives and rules.

The most common primary objective is to reduce inventory to some target by the end of the markdown interval, and, secondarily, to do so at the greatest profit possible. This pairing of competing objectives is typical—the first objective or primary objective is the goal of the markdown plan, whereas the secondary objective usually defines the criterion to pick a single optimal schedule from the number that may meet the primary objective. Buyers also wish to maximize profit (primary) while reducing inventory (secondary) or maximizing revenue (secondary) or maximizing revenue (primary) at highest possible revenue (secondary) or lowest possible ending inventory (secondary). Unlike the Price application, in the Markdown application the secondary constraint does not allow the user to choose a specific value that must be met. Rather it is assumed that the optimization will maximize the primary objective while keeping in mind that the user is also concerned about the variable in the secondary constraint. To be precise, of the competing optimal schedules (with respect to the primary goal), the optimization will pick the one that yields the best value of the secondary goal. A specific example of a mark down system will be provided in Part III Markdown System Example.

Buyers also set up several operating and business rules and constraints by setting values on the parameters that define them. These include the maximum number of markdown occasions that can be run within the time frame, the duration of the markdown cycle, and the maximum lifetime discount. As noted earlier, companies usually establish over-arching defaults for these rule parameters, which may then be modified or over-ridden by senior buyers or pricing organizations. The over-rides can take place at multiple levels of the product hierarchy and at various organizational levels within the organization.

In addition to business rules for markdown parameters and attributes the pricing and promotion optimizations also involve other rules as well, principally those that govern a merchandizing strategy. In general, these rules were grouped into three distinct sets—a set of pricing rules, a set of interaction rules, and a set of markdown rules.

In an example scenario, once a buyer, for example Bartholomew, has created the optimization scenario, he dispatches it to the optimization engine and takes the rest of the day off while the optimization works away at finding the optimal solution. It does this by searching through all potential solutions, filtering out the ones that don't meet the business and operational rules, evaluating the remaining candidates, and picking the one with the highest objective value.

In order to gauge the worth or fitness of a markdown plan defined using the support tool 116, a buyer must be able to predict how it will perform if implemented. The optimization also requires this predictive capability to evaluate and compare candidate solutions. Naturally, the metrics that capture the most relevant features of a markdown plan—its expected performance effectiveness financially and operationally depend on this capability and also constitute the content of the reports and charts that buyers use to choose between competing markdown plans. The support tool may further allow the collection of data after the specification of a prediction. The support tool may still further allow determining and displaying on the support tool a degree of difference between the collection of data after the specification of a prediction and the prediction.

The support tool may further allow the collection of data after the specification of a prediction. The support tool may still further allow determining and displaying on the support tool a degree of difference between the collection of data after the specification of a prediction and the prediction.

Once buyer Bartholomew has created a markdown plan through the support tool 116 or via an optimization scenario, he uses different reports and charts to evaluate the plan to determine if it is acceptable. To determine this, he has to assess different facets of performance of the plan. At the most granular level, the data for a plan consists of the price and the predicted demand for each store and each week in the markdown interval. Based on these two data elements, it is relatively easy to generate the predicted sales, the predicted ending inventory, the predicted revenue, the predicted profit (or loss) in each week for each product. These elements, in turn, can be aggregated across weeks, products, and stores to compare and contrast the performance of a plan by these dimensions. Buyers would like to be able to gain insight immediately into aspects of the plan that are out-of-kilter. For instance, if a set of products share the same markdown schedule, the overall results of the plan may be unduly affected by one underperforming product in the group. Buyers are always on the lookout for insightful reports that point out these issues. Similarly, one store or a set of stores among a larger set may exhibit dramatically different consumer response to a markdown and warrant an alternative schedule.

Additionally, the roll-ups are useful in comparing one plan against a competing one and choosing between them.

After the buyer has examined the results of one or more markdown plans and compared them to each other, he settles on one to approve with a view to implementing its recommendations in the stores. The optimizing system allows this process to be different for different retailers.

Operation

After the buyer has approved a markdown plan, the retailer's price execution systems receive the prices for implementation. Once the first set of markdown prices is on the shelf, the operational phase of markdown pricing begins in earnest. Since markdown cycles are usually very short and dynamic, buyers monitor results regularly and make changes to the approved plan if the actual performance and the predicted performance are sufficiently different. They may also take action to ensure that the larger goal of ensuring a smooth assortment transition is being met.

A Senior Buyer may have multiple sets of products on markdown over different sets of stores. Each combination of products and stores may be at different points in their respective markdown plans, but nonetheless, the buyer will often monitor the performance of all products under his purview at the same time. Typically, this happens on a weekly basis and consists of measuring the actual performance and comparing it against forecasted performance. Besides measuring performance of the products on markdown, buyers also keep tabs on the status of the replacement products and whether they are on schedule to arrive as planned. If actual sales and the forecasted sales are wildly at odds or if the replacement dates for products change, the buyer may take several corrective actions:

If the actual sales are considerably worse than expected the buyer may choose to accelerate the timing of the next planed markdown and increase the depth of the current markdown. These changes may occur at the product-store level, or at any higher level as deemed acceptable by corporate guidelines, as follows. If the actual sales are higher than forecasted, then the buyer may choose to delay the next planned markdown. In some cases, buyers may order extra inventory to meet demand for the product. Although this appears to be counter-intuitive to the stated purpose of markdown pricing which is to remove products from the assortment, such steps are sometimes necessary since exiting too quickly may lead to thin assortment and narrow consumer choice in the period before the replacement products arrive. If the arrival date for replacement dates moves forward by a few days or weeks the inventory of the incoming products will build up rapidly, and therefore the buyer may choose to accelerate the markdown of the obsolete product by bringing the out-date forward and by increasing decreasing the price. Conversely, if the replacement date for an incoming product is delayed, buyer may choose to slow down the markdown cycle for the existing product so that stores have sufficient assortment choice until the new product arrives. These kinds of changes can also be rapidly evaluated using the re-prediction/re-optimization feature that considers activities and outcomes to date and suggests a new markdown schedule for the remainder of the weeks, observing all the original set of rules specified by the user. It is important to note that some of these changes may be driven by other merchandising activities (changes in promotions or prices of related products) and the model explicitly takes this effect into account.

A buyer may be responsible for anywhere from 5-10 products on markdown to over 500 at any one time. Some retailers obtain their measures of performance from legacy systems and from metrics that have been honed over years of use. Other retailers obtain this information from a variety of sources.

The actions that a buyer may take in response to performance metrics and changes in replacement dates require him to decide on changes to the markdown plan. As outlined above, these changes involve the timing and depth of price changes as well as the time horizon of the proposed plan. The markdown product system flexibly allows the generation of recommendations every week that are approved automatically without a buyer's direct intervention or the generation of change recommendations that are first collected and scrutinized by a group of buyers and marketing managers, who approve the recommendations that pass muster, and the rest are ignored.

Products that are on markdown are tagged as such at many retailers and therefore buyers are able to filter products on markdown easily. In addition, they often refine this list further to view the performance of products on their first markdown versus those on their second and so on.

The markdown cycle for a set of products ends on the day that the stores remove the them from the shelf. At this point, the left over inventory may be disposed off by selling it to a third party, by returning it to a warehouse for future disposal, or, in some cases the inventory may be destroyed.

Markdown System Example

Model Form

For markdown in this embodiment an econometric model is used, which uses the univariate time-series approach to estimate demand curves within a markdown period. Specifically, in this embodiment, the multiplicative form of demand equation:

$$Sale(t) = Seasonality(t) * Product\_life\_cycle(t) * Price(t) * Err(t)$$

where

Sale(t)=sales in equivalent units in time period t.
Seasonality(t)=seasonality index in time period t
Product_life_cycle(t)=product life cycle index in time period t.
Price(t)=price effect in time period t.
Err(t)=random error in time period t.

The sales model is fit in four steps:
Seasonality estimation
Price elasticity and Product_life_cycle estimation
Clustering of related items, if necessary
Product_life_cycle estimation, if necessary
Stage 1: Seasonality Estimate First, seasonality is estimated using well known techniques that accounts for seasonal changes in the demand. In a preferred embodiment, products may be grouped into different sets based upon their characteristics including (but not limited to) sales profile, level of affinity between products, price elasticity of the products, promotion responses of the product etc. These seasonality profiles are propagated into the future and are also used for new upc's during the markdown period.

In a preferred embodiment, seasonality profiles can be created using the following equation:

$$\ln S_{i,s,t} = \sum_{k=1}^{52} \vartheta_k X_{t,k} \quad (1)$$

where $X_{t,k} = \delta_{t,k}$ (Kronecker delta, which is 1 only when t=k and 0 otherwise) and $\sigma_k$ is the common seasonality for all items in the cluster.

$$\vartheta_k = \frac{1}{N_{upc} N_{stores}} \sum_{i,s} \ln S_{i,s,t}$$

The seasonality coefficient for a given week corresponds to average (in log units) sales of all upc's over all stores for that week.

Stage 2: Price and Product Life Cycle Estimates

At the second stage, price elasticity and product life cycle terms are estimated for each upc. These terms are well defined in econometrics literature and as expected, many variants are available in the research literature. In the preferred embodiment, PLC(t) and Price(t) effects may be estimated in the following manner:

$$\tilde{S}_{i,s,t} = PLC_{i,s,t} \left( \frac{P_{max,i,s}}{P_{i,s,t}} \right)^\gamma \exp(\varepsilon_{i,s,t}) \quad (2)$$

The product life-cycle term ($PLC_{i,s,t}$) can again be represented in many ways. In the preferred embodiment it is represented by the following functional form:

$$PLC_{i,s,t} = \left( \frac{t_{i,s}}{T_{i,s}} \right)^{\alpha_i} \left( 1 - \frac{t_{i,s}}{T_{i,s}} \right)^{\beta_i}, t_{i,s} = 1, \ldots, T_{i,s} \quad (3)$$

where $\alpha_i$ and $\beta_i$ are the parameters to be estimated, $T_{i,s}$ is the total length of time item i is sold in store s. The PLC value was defined to be zero during weeks before the item was introduced and after it was removed. $T_{i,s}$ is the expected out-date for product i and is assumed to be known a priori (e.g. It could be provided by the user based upon their specific plans or the knowledge. In absence of any recommendation, a default value; may be used for example the life-span of products in a category. $P_{max,i,s}$ is the maximal price observed for a given upc-store combination throughout the sales history. The error term $\varepsilon_{i,s,t}$ was assumed to be normally distributed. However, extensions to non-normal errors can also be easily constructed.

Taking log transformations, the final stage 2 model takes the following form:

$$\ln(\tilde{S}_{i,s,t}) = q_i + \alpha_i \ln\left( \frac{t_{i,s}}{T_{i,s}} \right) + \beta_i \ln\left( 1 - \frac{t_{i,s}}{T_{i,s}} \right) + \gamma_i \ln\left( \frac{P_{max,i,s}}{P_{i,s,t}} \right) + \varepsilon_{i,s,t} \quad (4)$$

The user can tune the econometric model in multiple ways. Some of the specific embodiments would include:
Specifying time period for model training
Specifying the set of products and set of stores over which to train the model
Specifying interactions between the products to account for in the model training.

The Optimization model comprises a demand equation for determining demand, an inventory equation that is based on previous inventory minus sales, an initial sales-inventory balance equation, a sales-inventory balance equation, a sales demand balance equation, and a price definition equation. In an implementation of the invention, the user is able to select one primary objective and one secondary objective. The objectives include Maximize Profit, Maximize Revenue, and Minimize Inventory. This section will describe the formulation for each combination of objectives.

Given a product with a time horizon of t=0, ..., T and an initial inventory of $I_{i,s,0}$, the optimization will try to identify an optimal markdown schedule $\{d_{i,s,t}:0 \le t \le T\}$, where $d_{i,s,t}$ refers to the percentage discount applied to the initial product price at time t and store s for each markdown. Thus, the resulting price in period t is denoted by $P_{i,s,t}$ and is calculated as $P_{i,s,t} = P_{i,s,0}(1 - d_{i,s,t})$.

Optimization Objectives:

In this section, different objectives available to the users and how they are implemented in the preferred embodiment are listed. Since the application supports both a primary and a secondary objective, examples are based upon these combinations. Note that choosing only a primary objective is same as selecting the same goal for the primary and secondary objectives (e.g. Just profit objective is same as profit primary objective and profit secondary objective).

Profit-Profit Objective:

$$\text{Max}(S_{i,s,t} P_{i,s,t} - (I_{i,s,0} C_{i,s}) - (I_{i,s,t} C_{i,s} \text{CoC}) + (I_{i,s,T} SV_{i,s})),$$

where the subscript s refers to the store dimension and i for the product dimension and t for the time dimension. It should be noted that the same objective applies for simply having profit as the primary objective. $I_{i,s,0}$ represents the initial inventory at for product I in store s. $C_{i,s}$ is the unit product cost to the retailer for a product i at store s. CoC is called the cost of capital and represents the opportunity cost of having money tied up in inventory. $SV_{i,s}$ is called the Salvage Value and represents the recovery value of unsold inventory at the end of optimization period.

Revenue-Revenue Objective:

$$\text{Max}(S_{i,s,t} P_{i,s,t} + (I_{i,s,T} SV_{i,s}))$$

When the user picks revenue objective (or revenue primary and revenue secondary objectives), above equation is used for calculating revenues. Note that it does not include costs as in the previous case.

Inventory-Inventory Objective:

$$\text{Max}(S_{i,s,t} P_{i,s,t})$$

If the user selects a primary goal of minimizing inventory and a secondary constraint of inventory or null, then they will be solving the Inventory Objective above. It should be noted that the intent of the inventory objective is to minimize inventory on hand or to maximize sales volume.

Mixed Primary-Secondary Objectives:

When the user selects different primary and secondary objectives, then the optimization engine tries to identify a schedule that accounts for both, implicitly giving greater weight to primary goal and less to secondary goal. Although many different approaches can be taken to achieve this goal, in our preferred embodiment this is achieved by introducing additional terms in the objective function to reflect blending of different goals.

Profit-Inventory Objective or Revenue-Inventory:

$$\text{Max}(S_{i,s,t}P_{i,s,t}-(I_{i,s,0}C_{i,s})-(I_{i,s,t}C_{i,s}\text{CoC}))$$

The purpose of this objective is to select a schedule that chooses the best tradeoffs from a gross margin point of view while simultaneously considering the costs of holding inventory. Including the inventory costs explicitly will result into deeper markdowns than the case of just the profit objective.

Other combinations are applied in a similar manner.

The Econometric Model

Optimization engine uses the same econometric model as laid out earlier to determine demand forecasts based upon applicable conditions.

Inventory Balance Equation:

$$I_{i,s,t}=I_{i,s,t-1}-S_{i,s,t}$$

This equation just says that the inventory for this period is equal to the ending inventory from last period minus this week's sales.

Sales Equation:

$$S_{i,s,t}=\min\{D_{i,s,t},I_{i,s,t-1}\}$$

This equation ensures that actual sales are constrained both by the demand and inventory levels. In particular, the sales are set to be the minimum of these two levels in a given week. Note that $D_{i,s,t}$ represents the demand for product i in store s and time t.

Price Trend Definitions:

$$P_{i,s,t} \leq P_{i,s,t-1}$$

Where $P_{i,s,t}$ represents the selling price for product p in stores s in week t. This equation ensures that prices are strictly non-increasing. In other words, the selling price is not allowed to go up in any of the weeks when compared to the previous week as this is a fundamental requirement for markdown pricing.

General Constraints on Markdown Schedules

Only One Markdown per Week Equations:

This equation ensures only one markdown occasion per week is applied for a given storegroup-productgroup combination (from a set of all the allowable markdown points).

Pricing Rules

Maximum Weekly Discount Bounds:

This constraint limits any new markdown occasion to have a discount of less than MaxPctChangeM(sg,pg)—a value provided by the user. This value is a percentage and is hence constrained to be between 0 and 100. There are multiple reasons that would require that this value be set to a number such as 66%. This value can be specified separately for each (store, product) combination or for a group of stores and a group of products.

Minimum Weekly Discount Bounds:

This constraint requires that if a discount is taken in a given week, it should be larger than MinIncPctChangesg,pg, again a percentage value provided by the user. Again, there are a number of reasons for requiring this behavior, including business and legal reasons. Like in the previous case, this can be specified separately for each (store,product) combination or for a group of stores and a group of products.

Timing Rules

Minimum Number of Weeks Till First Markdown Bounds:

This allows the user to choose the first allowable occasion for taking a markdown. This value is specified as number of weeks and is interpreted to be the number of weeks from the beginning of scenario period during which a markdown may not be taken.

Maximum Number of Markdown Occasions Constraints:

This constraint helps the user to control maximum number of markdown occasions and is provided by the user as an integer number.

Time Gap Separation Constraints:

This allows the user to specify the time gap between two consecutive markdown occasions. Parameter gap(sg,pg) is used to capture this input from the user.

Other Business Rules

Minimum Inventory for a Markdown Bounds:

This gives the user control over the markdown behavior and instructs the optimization engine to not take any markdowns for (store,product) or (store-group, product-group) combinations where the inventory level falls below the user specified level. One of the reasons for this requirements is the fact that very low inventory numbers tend to be unreliable and do not provide a good opportunity for realizing gains.

Markdown Budget Dollars

This constraint will limit the markdowns to ensure that the markdown budget is observed. For example, a user can specify the markdown budget (in absolute dollars or in terms of profit margins) that has to be observed across a set of products. In a specific example, the user may set a markdown budget of $1 million for a category and across the chain.

Rule Hierarchy and Rule Relaxation:

In the preferred embodiment, the application enables users to specify a number of different business rules. At times, not all of these rules can be satisfied. A number of different methods may be used to address this situation. In a preferred embodiment, the optimization engine supports a user-defined hierarchy of rules. This ensures that the most important rules get satisfied before less important ones. Further, in case of conflicts, this same hierarchy is used to relax lower priority rules to ensure compliance with higher priority rule. Another feature of this method is that it merely relaxes rules rather than dropping them. The optimization engine may further comprise computer readable code for storing a plurality of rules, computer readable code for allowing the prioritization of the plurality of rules, and computer readable code for relaxing at least one lower priority rule to allow a higher priority rule to become feasible.

During an optimization, it may be found that a rule is infeasible. A rule is determined to be infeasible, if either it cannot be satisfied when all other rules are satisfied or if an optimization cannot be performed without violating the rule. One method of dealing with an infeasible rule is to drop the rule found to be infeasible.

For example, the user defines a rule that requires a minimum gap of 3 weeks between markdowns. Then, the user defines another rule (at the lowest priority) that specifies the minimum discount amount in case of a markdown be 20%. In addition, there may be other (higher priority) rules that may cause the above two rules to be infeasible. In this embodiment, we might relax the lowest priority rule to allow markdown discounts of 15% (instead of the 20% as initially stipulated).

Figure 5:
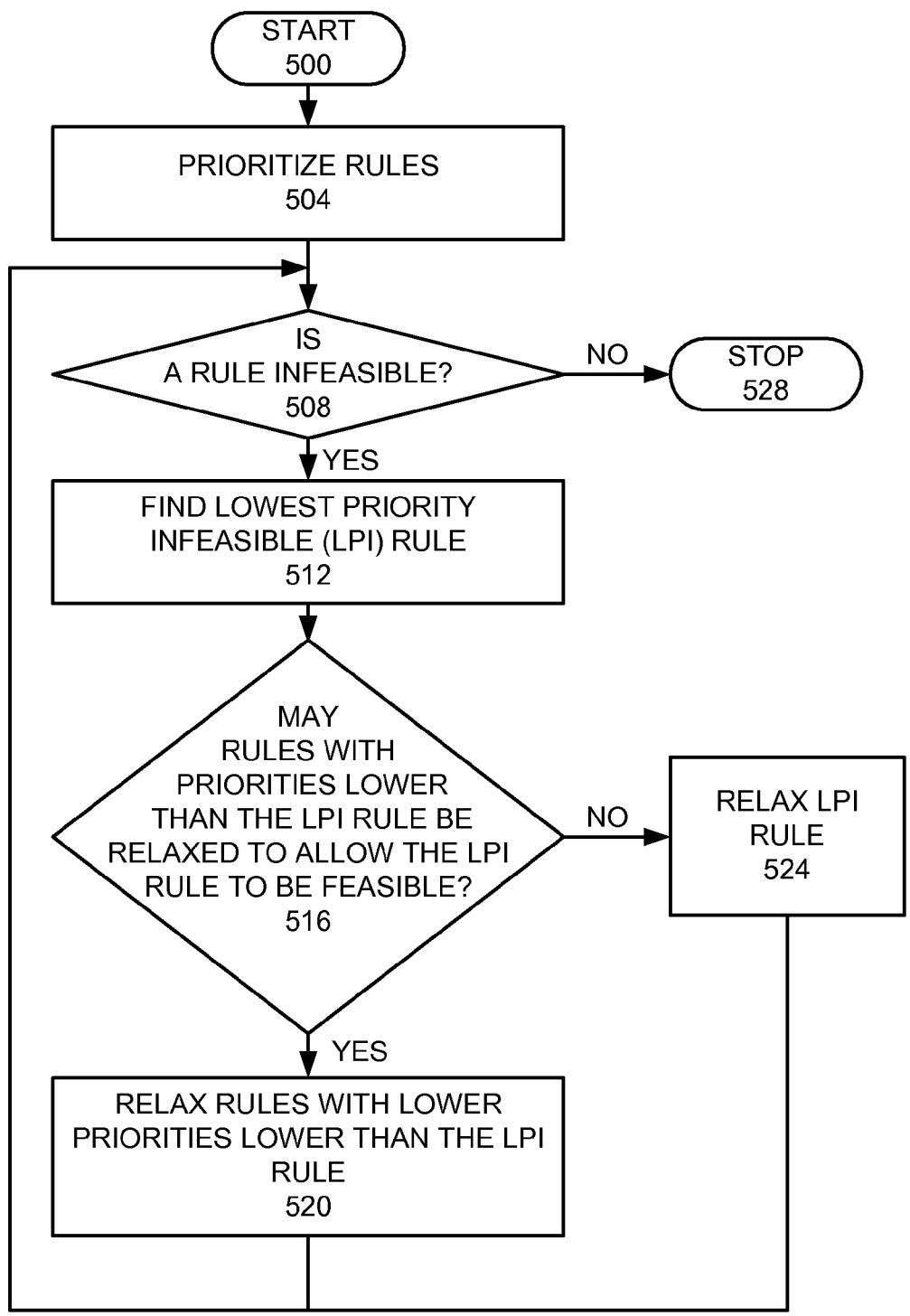
FIG. 5 is a flow chart of a rule relaxation process that may be used by the invention.

FIG. 5 is a flow chart of a preferred embodiment of a rule relaxation process. The rules are prioritized (step 504). A default prioritization may be provided, with an interface, which may allow a user to change the prioritization from the default. A check is made to see if a rule is infeasible (step 508). A rule is deemed to be infeasible if the relationship expressed by the rule is not able to be satisfied. For instance a rule X+Y≤10, is violated for when X is 7 and Y is 7 since then X+Y=14 which is greater then 10. If no rule is found to be infeasible, the rule relaxation process is stopped (step 528). If at least one rule is found to be infeasible, the lowest priority infeasible (LPI) rule is found (step 512). A determination is made whether rules with lower priorities than the priority of the LPI rule may be relaxed to allow the LPI rule to become feasible (step 516). In the preferred embodiment, the lower priority rules are checked before higher priority rules. If it is found that rules with lower priorities than that priority of the LPI rule may be relaxed to a point that allows the LPI rule to be come feasible, then these rules with lower priorities are relaxed incrementally so that the LPI rule becomes feasible (step 520). In the preferred embodiment, lower priority rules are relaxed before higher priority rules. If it is found that rules with lower priorities than the priority of the LPI rule cannot be relaxed to allow the LPI rule to become feasible, then the LPI rule is relaxed until it becomes feasible (step 524). The rules are then rechecked to see if there are any remaining rules that are infeasible (step 508). This process is continued until all rules are feasible.

In the preferred implementations, the specific infeasible solution at which the optimization process stops will depend on the optimization algorithm and the initial starting point. This means that specific rules that are relaxed in order to get to feasibility depend on both the optimization algorithm and the starting values These examples are merely illustrative and are not meant to limit the scope of the invention. In addition, rule priority was assigned by rule category. In other embodiments the rule priority may be assigned to individual rules instead of to rule categories.

Other specific methods of rule relaxation may be used. In general, rule relaxation methods provide for the prioritization of rules and cause lower priority rules to be relaxed before relaxing higher priority rules in order to make all resulting rules feasible. Another specific embodiment of this general rule relaxation method may allow different combinations of lower priority rules to be relaxed. These lower priority rules may be relaxed at the same rate or at different rates until the higher priority rule becomes feasible. Different combinations of the relaxation of lower priority rules may be specified in different embodiments.

If the user selects Profit as their primary goal and either Inventory or Revenue as their secondary constraint, then the optimization will solve the Profit-Inventory objective. The purpose of this objective is to select a schedule that chooses the best tradeoffs from a gross margin point of view while simultaneously considering the costs of holding inventory. The hope is that the inventory costs will increase the sales volume early in the schedule.

Various constraints may be used, such as minimum and maximum price discounts for markdown, timing between markdowns, maximum number of markdowns, periods between markdowns, and minimum amount of inventory.

While this invention has been described in terms of several preferred embodiments, there are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. An apparatus for providing optimized pricing for a plurality of markdown items for at least one store, comprising:
a financial engine, including computer memory executed using a processor, for determining revenue for determining sales costs;
an optimization engine, including computer memory executed using the processor, receiving input from the financial engine for using the determined sales costs and providing optimized pricing for markdown items and provides pricing and a promotion calendar for non-markdown items, wherein the optimized pricing for markdown items includes a primary objective and a secondary objective, and wherein providing optimized pricing includes selecting between competing optimal schedules by weighting the primary objective and the secondary objective wherein the primary objective has a greater weight than the secondary objective, and wherein the selecting optimizes for the weighted objectives, the optimization engine comprising:
an engine, including computer memory executed using the processor, for providing non-markdown item pricing;
an engine, including computer memory executed using the processor, for providing a promotion calendar; and
an engine, including computer memory executed using the processor, for providing markdown item pricing.

2. The apparatus, as recited in claim 1, further comprising an econometric engine for determining demand coefficients and providing the determined coefficients to the optimization engine.

3. The apparatus, as recited in claim 2, further comprising a computer system on which the financial engine, econometric engine, and optimization engine are implemented.

4. The apparatus, as recited in claim 3, Wherein the financial engine generates cost data.

5. The apparatus, as recited in claim 4, further comprising a support tool with a graphic user interface for specifying markdown price constraints and providing the constraints to the optimization engine.

6. The apparatus, as recited in claim 5, wherein the graphic user interface further comprises a graphical user interface for designating markdown items and setting markdown rules.

7. The apparatus, as recited in claim 5, wherein the support tool allows the implementation of the plan.

8. The apparatus, as recited in claim 5, wherein the support tool provides a tuning indicator that indicate when tune thresholds are met, wherein the tuning indicator recommends tuning of markdown item pricing and promotion calendar, and wherein the tune thresholds are changes in conditions substantial enough to materially impact the quality of the previous optimized pricing and promotion calendar.

9. The apparatus, as recited in claim 5, wherein the support tool allows the specification of restraint rules.

10. The apparatus, as recited in claim 9, wherein the support tool further allows the specification of a hierarchy for the restraint rules.

11. The apparatus, as recited in claim 9, wherein a restraint rule allows the specification of a minimum time period between markdowns.

12. The apparatus, as recited in claim 11, wherein a restraint rule allows the specification of a minimum price reduction.

13. The apparatus, as recited in claim 12, wherein a restraint rule allows the specification of a unique last digit to signify a markdown price reduction.

14. The apparatus, as recited in claim 13, wherein a restraint rule allows specification of markdown start and end dates for a markdown product.

15. The apparatus, as recited in claim 14, wherein the restraint rules further allows specification of salvage value of a markdown product.

16. The apparatus, as recited in claim 9, wherein the support tool allows the specification of product groups and a hierarchy wherein product hierarchy is dependent on the product group in which a product is placed and restraint rules are modified and applied according to the hierarchy.

17. The apparatus, as recited in claim 16, Wherein the support tool further allows the specification of store clusters, so that the constraint rules are modified and applied according to product hierarchy and store cluster.

18. The apparatus, as recited in claim 5, wherein the support tool further allows the specification of a markdown budget constraint.

19. The apparatus, as recited in claim 5, wherein the support tool further allows the specification of a prediction, which provides predicted sales of a optimized pricing.

20. The apparatus, as recited in claim 19, wherein the support tool further allows the collection of data after the specification of a prediction and determining and displaying on the support tool a degree of difference between the collection of data after the specification of a prediction and the prediction.

21. The apparatus, as recited in claim 3, wherein the econometric engine receives data on at least a weekly basis, wherein the econometric engine provides output to the optimization engine on at least a weekly basis and wherein the optimization engine revises the provided relative optimized pricing for markdown items on at least a weekly basis.

22. The apparatus, as recited in claim 3, wherein the optimization engine receives data related to in-store and warehouse inventory levels and uses the in-store and warehouse inventory levels to determine markdown prices.

23. The apparatus, as recited in claim 1, wherein the optimizing engine, comprises:
computer readable code for storing a plurality of rules;
computer readable code for allowing the prioritization of the plurality of rules; and
computer readable code for relaxing at least one lower priority rule to allow a higher priority rule to become feasible.

24. The apparatus, as recited in claim 1, wherein the optimization engine provides optimized pricing by generating a price and promotion plan and then generating an optimized markdown plan based on the generated price and promotion plan.

25. The apparatus, as recited in claim 1, wherein the optimization engine manages conflicts between optimized pricing for markdown items and pricing and promotions for non-markdown items.

26. A computer implemented method for providing pricing for markdown items and non-markdown items, comprising:
collecting sales, cost, and competitive data from a plurality of stores;
analyzing, using a computer processor, the collected sales, cost, and competitive data, to generate competing optimal schedules with respect to a primary objective;
providing, using the computer processor, optimized pricing and a markdown schedule for markdown items and optimized pricing for non-markdown items, wherein the markdown schedule includes a primary objective and a secondary objective, and wherein providing optimized pricing includes selecting between competing optimal schedules by weighting the primary objective and the secondary objective wherein the primary objective has a greater weight than the secondary objective, and where in the selecting optimizes for the weighted objectives;
analyzing, using the computer processor, on an at least weekly basis sales of the markdown items;
tuning, using the computer processor, the markdown schedule based on analyzing data collected on an at least weekly basis; and
providing tuned markdown schedule.

27. The computer implemented method, as recited in claim 26, wherein the providing pricing and the markdown schedule further provides a promotion schedule, further comprising:
analyzing on a weekly basis sales of promotional items;
tuning the promotion schedule; and
providing a tuned promotion schedule.

28. The computer implemented method, as recited in claim 27, wherein the providing pricing and the markdown calendar is performed after pricing of non-markdown items and promotion schedule has been optimized and uses the pricing of the non-markdown items and promotion schedule.

29. The computer implemented method, as recited in claim 26, further comprising receiving user supplied markdown price constraints.

30. The computer implemented method, as recited in claim 26, further comprising providing a tuning indicator, which indicates when tuning thresholds are met, wherein the tuning indicator recommends tuning of markdown item pricing and promotion calendar, and wherein the tune thresholds are changes in conditions substantial enough to materially impact the quality of the previous optimized pricing and promotion calendar.

31. The computer implemented method, as recited in claim 26, further comprising receiving user supplied constraint rules.

32. The computer implemented method, as recited in claim 31, wherein the constraint rules have a user defined hierarchy.

33. The computer implemented method, as recited in claim 31, wherein a restraint rule allows the specification of a minimum price reduction.

34. The computer implemented method, as recited in claim 31, wherein a restraint rule allows the specification of a unique last digit to signify a markdown price reduction.

35. The computer implemented method, as recited in claim 31, wherein a restraint rule allows specification of markdown start and end dates for a markdown product.

36. The computer implemented method, as recited in claim 31, wherein the restraint rules allows specification of salvage value of a markdown product.

37. An apparatus for providing optimized pricing for markdown items, comprising:
a financial engine, including computer memory executed using a processor, for determining revenue for determining sales costs;
an optimization engine, including computer memory executed using the processor, configured to receive input from the financial engine for using the determined sales costs, provide competing optimal schedules with respect to the primary objective, provide optimized pricing for markdown items and provide optimized pricing and a promotion calendar for non-markdown items, wherein the optimized pricing for markdown items includes a primary objective and a secondary objective, and wherein the optimized pricing includes selecting between competing optimal schedules by weighting the primary objective and the secondary objective wherein the primary objective has a greater weight than the secondary objective, and wherein the selecting optimizes for the weighted objectives.

38. The apparatus, as recited in claim 37, further comprising an econometric engine for determining demand coefficients and providing the determined coefficients to the optimization engine.

39. The apparatus, as recited in claim 38, further comprising a computer system on which the financial engine, econometric engine, and optimization engine are implemented.

40. The apparatus, as recited in claim 39, wherein the financial engine generates cost data.

41. The apparatus, as recited in claim 40, further comprising a support tool with a graphic user interface for specifying markdown price constraints and providing the constraints to the optimization engine.

42. The apparatus, as recited in claim 41, wherein the graphic user interface further comprises a graphical user interface for designating markdown items and setting markdown rules.

43. The apparatus, as recited in claim 41, wherein the support tool allows the implementation of the plan.

44. A computer storage product comprising:
a non-transitory computer readable memory device having computer readable program code embodied therewith for execution on a first processing system, the computer readable program code comprising computer readable program code configured to:
collect sales, cost, and competitive data from a plurality of stores;
analyze the collected sales, cost, and competitive data, to generate competing optimal schedules with respect to a primary objective;
provide optimized pricing and a markdown schedule for markdown items and optimized pricing for non-markdown items, wherein the markdown schedule includes a primary objective and a secondary objective, and wherein providing optimized pricing includes selecting between competing optimal schedules by weighting the primary objective and the secondary objective wherein the primary objective has a greater weight than the secondary objective, and where in the selecting optimizes for the weighted objectives;
analyze on an at least weekly basis sales of the markdown items;
tune the markdown schedule based on analyzing data collected on an at least weekly basis; and
provide tuned markdown schedule.

45. The computer storage product of claim 44, wherein the computer readable program code further comprises computer readable program code configured to:
analyze on a weekly basis sales of promotional items to provide a promotion schedule;
tune the promotion schedule; and
provide a tuned promotion schedule.

46. The computer storage product of claim 45, wherein the computer readable program code further comprises computer readable program code configured to;
provide the pricing and markdown calendar after pricing of nonmarkdown items and promotion schedule has been optimized and using the pricing of the nonmarkdown items and promotion schedule.

47. The computer storage product of claim 44, wherein the computer readable program code further comprises computer readable program code configured to:
receive user supplied markdown price constraints.

48. The computer storage product of claim 44, wherein the computer readable program code further comprises computer readable program code configured to provide a tuning indicator, which indicates when tuning thresholds are met, wherein the tuning indicator recommends tuning of markdown item pricing and promotion calendar, and wherein the tune thresholds are changes in conditions substantial enough to materially impact the quality of the previous optimized pricing and promotion calendar.

49. The computer storage product of claim 44, wherein the computer readable program code further comprises computer readable program code configured to receive user supplied constraint rules.

50. The computer storage product of claim 49, wherein the constraint rules have a user defined hierarchy.

51. The computer storage product of claim 49, wherein a restraint rule allows the specification of a minimum price reduction.

52. The computer storage product of claim 49, wherein a restraint rule allows the specification of a unique last digit to signify a markdown price reduction.

53. The computer storage product of claim 49, wherein a restraint rule allows specification of markdown start and end dates for a markdown product.

54. The computer storage product of claim 49, wherein the restraint rules allows specification of salvage value of a markdown product.

* * * * *